US011170651B2

(12) United States Patent
Kiryu et al.

(10) Patent No.: US 11,170,651 B2
(45) Date of Patent: Nov. 9, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Hironobu Kiryu, Wako (JP); Mahito Shikama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 235 days.

(21) Appl. No.: 16/416,299

(22) Filed: May 20, 2019

(65) Prior Publication Data

US 2019/0362633 A1 Nov. 28, 2019

(30) Foreign Application Priority Data

May 24, 2018 (JP) .............................. JP2018-100048

(51) Int. Cl.
*G08G 1/16* (2006.01)
*G06K 9/00* (2006.01)
*B60W 30/18* (2012.01)
*B60W 30/14* (2006.01)

(52) U.S. Cl.
CPC ........... *G08G 1/167* (2013.01); *B60W 30/143* (2013.01); *B60W 30/18163* (2013.01); *G06K 9/00798* (2013.01)

(58) Field of Classification Search
CPC .................................................... G08G 1/167
See application file for complete search history.

(56) References Cited

U.S. PATENT DOCUMENTS 9,902,399 B2 * 2/2018 Torii ...................... B60W 50/14
10,031,523 B2 * 7/2018 Ricci ................. G08G 1/096725
10,166,981 B2 * 1/2019 Horita ............. B60W 30/18163
(Continued)

FOREIGN PATENT DOCUMENTS

JP 2000-018956 1/2000
JP 2016-088504 5/2016
(Continued)

OTHER PUBLICATIONS

Japanese Office Action for Japanese Patent Application No. 2018-100048 dated Dec. 10, 2019.

*Primary Examiner* — Alex C Dunn
(74) *Attorney, Agent, or Firm* — Amin, Turocy & Watson, LLP

(57) ABSTRACT

A vehicle control device according to an embodiment includes a recognition unit configured to recognize a surrounding situation of a subject vehicle, a reception unit configured to receive an input of a set vehicle speed set by an occupant of the subject vehicle, and a driving control unit configured to control one or both of steering and acceleration or deceleration of the subject vehicle on the basis of the surrounding situation recognized by the recognition unit and the set vehicle speed received by the reception unit. In a case in which a plurality of traveling lanes on which the subject vehicle is able to travel in a progress direction of the subject vehicle are recognized by the recognition unit, the driving control unit determines a lane on which the subject vehicle travels among the plurality of traveling lanes on the basis of the set vehicle speed.

12 Claims, 11 Drawing Sheets

(56) References Cited

U.S. PATENT DOCUMENTS

| | | | |
|---|---|---|---|
| 10,538,244 B2* | 1/2020 | Niino | B60W 30/18163 |
| 10,549,780 B2* | 2/2020 | Watanabe | B62D 15/0265 |
| 10,919,540 B2* | 2/2021 | Tsuji | B60W 50/10 |
| 2015/0025800 A1* | 1/2015 | An | G06K 9/6289 |
| | | | 701/523 |
| 2015/0356869 A1* | 12/2015 | Young | B60Q 9/008 |
| | | | 340/901 |
| 2016/0325750 A1* | 11/2016 | Kanda | B60W 30/18163 |
| 2017/0240176 A1* | 8/2017 | Aoki | G08G 1/167 |
| 2017/0313311 A1* | 11/2017 | Niino | B60W 30/146 |
| 2018/0128635 A1* | 5/2018 | Nakamura | B60W 30/12 |
| 2019/0205674 A1* | 7/2019 | Silver | B60W 40/105 |
| 2019/0304302 A1* | 10/2019 | Knauer | G06K 9/00798 |
| 2020/0298849 A1* | 9/2020 | Tanaka | G06K 9/00798 |

FOREIGN PATENT DOCUMENTS

| | | |
|---|---|---|
| JP | 2016-182891 | 10/2016 |
| JP | 2016-222121 | 12/2016 |
| WO | 2017/207398 | 12/2017 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-100048, filed May 24, 2018, the content of which is incorporated herein by reference.

BACKGROUND OF THE INVENTION

Field of the Invention

The present invention relates to a vehicle control device, a vehicle control method, and a storage medium.

Description of Related Art

In recent years, research on automated control of a vehicle has been performed. In relation to this, a technology of determining a recommended lane on which a subject vehicle is to travel, on the basis of a set vehicle speed set for causing the subject vehicle to travel at a constant speed, and a comparison between a traveling situation of a preceding vehicle traveling on a traveling lane of the subject vehicle and a traveling situation of an adjacent vehicle traveling ahead of the subject vehicle in an adjacent lane is known (for example, Japanese Unexamined Patent Application, First Publication No. 2016-088504).

SUMMARY OF THE INVENTION

However, in the related art, since a following traveling of the preceding vehicle continues until the adjacent vehicle is recognized, there may be a case in which it is not possible to execute driving control that is adapted for a road environment such as a surrounding traffic flow or a road form.

An aspect of the present invention has been made in consideration of such circumstances, and an object of the aspect of the present invention is to provide a vehicle control device, a vehicle control method, and a storage medium capable of executing driving control adapted for a road environment.

A vehicle control device, a vehicle control method, and a storage medium according to the present invention adopt the following constitutions.

(1): A vehicle control device according to an aspect of the present invention includes a recognition unit configured to recognize a surrounding situation of a subject vehicle, a reception unit configured to receive an input of a set vehicle speed set by an occupant of the subject vehicle, and a driving control unit configured to control one or both of steering and acceleration or deceleration of the subject vehicle on the basis of the surrounding situation recognized by the recognition unit and the set vehicle speed received by the reception unit. In a case in which a plurality of traveling lanes on which the subject vehicle is able to travel in a progress direction of the subject vehicle are recognized by the recognition unit, the driving control unit determines a lane on which the subject vehicle travels among the plurality of traveling lanes on the basis of the set vehicle speed.

(2): In the aspect of (1) described above, in a case in which it is recognized by the recognition unit that there are three or more lanes including two or more traveling lanes on which the subject vehicle is able to travel in the progress direction of the subject vehicle and overtaking lanes, the driving control unit determines the lane on which the subject vehicle travels among the three or more lanes on the basis of the set vehicle speed.

(3): In the aspect of (1) described above, the recognition unit recognizes speed sign information or traffic flow speed information of the lane on which the vehicle travels on the basis of the surrounding situation, and the driving control unit determines the lane on which the subject vehicle travels among the plurality of traveling lanes on the basis of a result of a comparison between the set vehicle speed and the speed sign information or the traffic flow speed information recognized by the recognition unit.

(4): In the aspect of (1) described above, in a case in which a preceding vehicle traveling in front of a traveling lane on which the subject vehicle travels is recognized by the recognition unit, the driving control unit determines the lane on which the subject vehicle travels among the plurality of lanes.

(5): In the aspect of (2) described above, in a case in which a vehicle speed of a preceding vehicle traveling in front of a traveling lane on which the subject vehicle recognized by the recognition unit travels is less than a vehicle speed of the subject vehicle and a speed difference between a vehicle speed of the preceding vehicle and the vehicle speed or the set vehicle speed of the subject vehicle is equal to or greater than a threshold value, the driving control unit executes driving control for overtaking the preceding vehicle by a lane change from the traveling lane to an overtaking lane, determines whether or not to perform a lane change for returning the subject vehicle to the traveling lane from the overtaking lane after executing the driving control, and determines the lane on which the subject vehicle travels on the basis of a determined result.

(6): In the aspect of (5) described above, among other vehicles recognized by the recognition unit, in a case in which the vehicle speed of the preceding vehicle traveling on the overtaking lane is equal to or less than a speed of speed sign information of the lane on which the subject vehicle travels or the vehicle speed of the subject vehicle, the driving control unit suppresses the lane change of the subject vehicle.

(7): In the aspect of (5) described above, among a plurality of other vehicles recognized by the recognition unit, the driving control unit compares the vehicle speed of the preceding vehicle traveling on the traveling lane with the vehicle speed of the preceding vehicle traveling on the overtaking lane, and in a case in which the vehicle speed of the preceding vehicle traveling on the overtaking lane is faster than the vehicle speed of the preceding vehicle traveling on the traveling lane, the driving control unit executes the lane change from the traveling lane to the overtaking lane.

(8): In the aspect of (1) described above, in a case in which the number of lanes of the traveling lane recognized by the recognition unit increases, the driving control unit suppress a lane change of the subject vehicle until the subject vehicle travels a predetermined distance from a point where the number of lanes increases or until a predetermined time has elapsed after passing through the point where the number of lanes increases.

(9): In the aspect of (1) described above, in a case in which a traveling time or a traveling distance of the lane on which the subject vehicle travels is equal to or less than a predetermined value, the driving control unit suppresses execution of a lane change.

(10): In the aspect of (1) described above, the vehicle control device further includes a route determination unit configured to determine a traveling route to a destination of the subject vehicle, and in a case in which a lane based on the traveling route determined by the route determination unit is different from a lane determined on the basis of the set vehicle speed, the driving control unit prioritizes the lane based on the traveling route.

(11): In the aspect of (10) described above, in a case in which a distance to a point where the lane based on the traveling route determined by the route determination unit is different from the lane determined on the basis of the set vehicle speed is equal to or greater than a predetermined distance, or a time for which the subject vehicle arrives at the point where the lane based on the traveling route determined by the route determination unit is different from the lane determined on the basis of the set vehicle speed is equal to or greater than a predetermined time, the driving control unit prioritizes the lane determined on the basis of the set vehicle speed.

(12): A vehicle control method according to an aspect of the present invention is a vehicle control method of causing a vehicle control device to recognize a surrounding situation of a subject vehicle, receive, by a reception unit, an input of a set vehicle speed set by an occupant of the subject vehicle, and execute driving control for controlling one or both of steering and acceleration or deceleration of the subject vehicle on the basis of the recognized surrounding situation and the set vehicle speed received by the reception unit. In a case in which a plurality of traveling lanes on which the subject vehicle is able to travel in a progress direction of the subject vehicle are recognized by the surrounding situation, a lane on which the subject vehicle travels is determined among the plurality of traveling lanes on the basis of the set vehicle speed.

(13): A storage medium according to an aspect of the present invention is a computer-readable non-transitory storage medium storing a program that causes a vehicle control device to recognize a surrounding situation of a subject vehicle, receive, by a reception unit, an input of a set vehicle speed set by an occupant of the subject vehicle, and execute driving control for controlling one or both of steering and acceleration or deceleration of the subject vehicle on the basis of the recognized surrounding situation and the set vehicle speed received by the reception unit. In a case in which a plurality of traveling lanes on which the subject vehicle is able to travel in a progress direction of the subject vehicle are recognized by the surrounding situation, a lane on which the subject vehicle travels is determined among the plurality of traveling lanes on the basis of the set vehicle speed.

According to the aspects of (1) to (13) described above, it is possible to execute driving control adapted for a road environment.

DETAILED DESCRIPTION OF THE INVENTION

Hereinafter, embodiments of a vehicle control device, a vehicle control method, and a storage medium of the present invention will be described with reference to the drawings. The vehicle control device of the embodiment is applied to an automated driving vehicle. The automated driving is, for example, executing driving control by controlling one or both of steering and acceleration or deceleration of a vehicle. In the following, a case in which a law on a left side is applied to the present invention will be described, but in a case in which a law on a right side is applied to the present invention, it is only necessary to reverse a left and a right.

[Overall Constitution]

Figure 1:
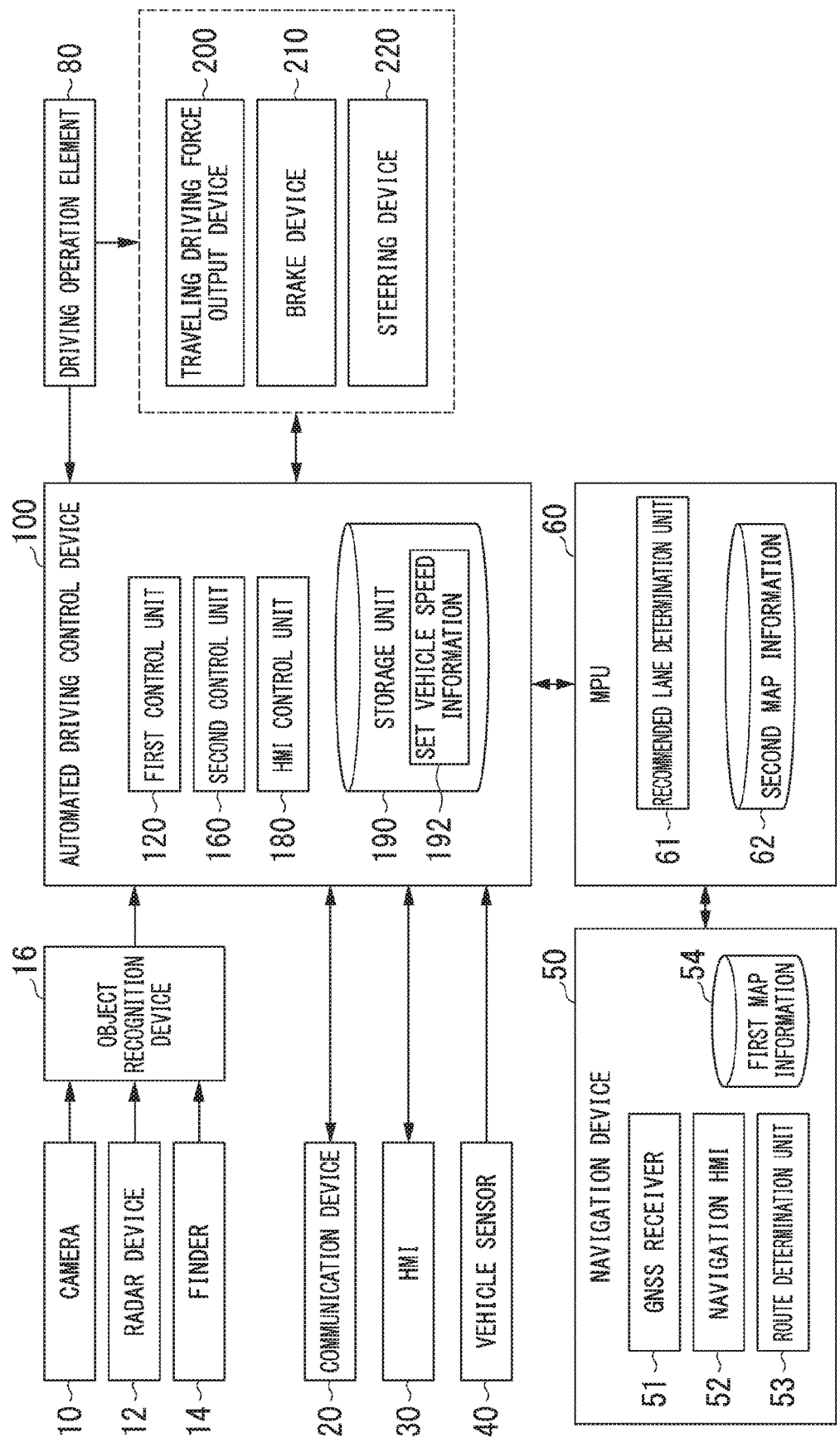
FIG. 1 is a constitution diagram of a vehicle system using a vehicle control device according to an embodiment.

FIG. 1 is a constitution diagram of a vehicle system 1 using the vehicle control device according to the embodiment. A vehicle in which the vehicle system 1 is mounted is, for example, a vehicle such as a two-wheeled vehicle, a three-wheeled vehicle, or a four-wheeled vehicle, and a driving source of the vehicle is an internal combustion engine such as a diesel engine or a gasoline engine, an electric motor, or a combination thereof. The electric motor operates using electric power generated by a generator connected to the internal combustion engine or electric power discharged by a secondary battery or a fuel cell.

For example, the vehicle system 1 includes a camera 10, a radar device 12, a finder 14, an object recognition device 16, a communication device 20, a human machine interface (HMI) 30, a vehicle sensor 40, a navigation device 50, a map positioning unit (MPU) 60, a driving operation element 80, an automated driving control device 100, a traveling driving force output device 200, a brake device 210, and a steering device 220. Such devices and instruments are connected to each other by a multiple communication line such as a controller area network (CAN) communication line, a serial communication line, a wireless communication network, or the like. The constitution shown in FIG. 1 is merely an example, and a part of the constitution may be omitted or another constitution may be further added. The automated driving control device 100 is an example of a "vehicle control device". A combination of the HMI 30 and the HMI control unit 180 is an example of a "reception unit".

For example, the camera 10 is a digital camera using a solid imaging element such as a charge coupled device (CCD) or a complementary metal oxide semiconductor (CMOS). The camera 10 is attached to an arbitrary place on the vehicle (hereinafter, a subject vehicle M) in which the vehicle system 1 is mounted. In a case of forward imaging, the camera 10 is attached to an upper portion of a front windshield, a rear surface of a rearview mirror, or the like. For example, the camera 10 periodically repeats imaging of the surroundings of the subject vehicle M. The camera 10 may be a stereo camera.

The radar device 12 radiates radio waves such as millimeter waves or the like to the surroundings of the subject vehicle M and detects at least the position (distance and direction) of an object by detecting radio waves (reflected waves) reflected by the object. The radar device 12 is attached to an arbitrary place on the subject vehicle M. The radar device 12 may detect the position and the speed of the object by a frequency modulated continuous wave (FM-CW) method.

The finder 14 is a light detection and ranging (LIDAR). The finder 14 irradiates light around the subject vehicle M and measures scattered light. The finder 14 detects the distance to the object on the basis of a time from light emission to light reception. For example, the irradiated light is laser light of a pulse shape. The finder 14 is attached to an arbitrary place on the subject vehicle M.

The object recognition device 16 performs a sensor fusion process on a detection result by a part or all of the camera 10, the radar device 12, and the finder 14 to recognize a position, a type, a speed, and the like of the object. The object recognition device 16 outputs a recognition result to the automated driving control device 100. The object recognition device 16 may output the detection result of the camera 10, the radar device 12, and the finder 14 as they are to the automated driving control device 100. The object recognition device 16 may be omitted from the vehicle system 1. The camera 10 includes an infrared camera that images a change of a surface temperature of an object, in addition to a camera that captures a normal image. The camera 10 may be a camera for switching between normal imaging and infrared imaging depending on a function provided to the camera 10.

For example, the communication device 20 communicates with another vehicle that is present around the subject vehicle M using a cellular network, a Wi-Fi network, Bluetooth (registered trademark), dedicated short range communication (DSRC), or the like, or communicates with various server devices through a wireless base station.

The HMI 30 presents various types of information to an occupant of the subject vehicle M and receives an input operation by the occupant. The HMI 30 includes various display devices, speakers, buzzers, touch panels, switches, keys, light emitting devices provided in a vehicle compartment, and the like. The HMI 30 includes, for example, a switch that receives setting of a target speed (hereinafter, referred to as a set vehicle speed) when the subject vehicle M travels by an occupant. A part of a constitution of the HMI 30 may be provided in the driving operation element 80 (for example, a steering wheel).

The vehicle sensor 40 includes a vehicle speed sensor that detects a speed of the subject vehicle M, an acceleration sensor that detects acceleration, a yaw rate sensor that detects an angular velocity around a vertical axis, a direction sensor that detects a direction of the subject vehicle M, and the like. The acceleration includes, for example, at least one of longitudinal acceleration with respect to the progress direction of the subject vehicle M and lateral acceleration with respect to a lateral direction of the subject vehicle M.

For example, the navigation device 50 includes a global navigation satellite system (GNSS) receiver 51, a navigation HMI 52, and a route determination unit 53. The navigation device 50 holds first map information 54 in a storage device such as a hard disk drive (HDD) or a flash memory. The GNSS receiver 51 specifies the position of the subject vehicle M on the basis of a signal received from a GNSS satellite. The position of the subject vehicle M may be specified or supplemented by an inertial navigation system (INS) using an output of the vehicle sensor 40. The navigation HMI 52 includes a display device, a speaker, a touch panel, a key, and the like. A part or all of the navigation HMI 52 may be shared with the HMI 30 described above. For example, the route determination unit 53 determines a route (hereinafter referred to as a route on a map) from the position of the subject vehicle M specified by the GNSS receiver 51 (or an input arbitrary position) to a destination input by the occupant using the navigation HMI 52 by referring to the first map information 54. For example, the first map information 54 is information in which a road form is expressed by a link indicating a road and nodes connected by the link. The first map information 54 may include a curvature of the road, point of interest (POI) information, or the like. The first map information 54 may include information on a geographic feature. The information on the geographic feature includes a geographic feature ID that is identification information of the geographic feature, position information of the geographic feature, an attribute (genre) of the geographic feature, and guidance information based on the geographic feature. The geographic features include, for example, a landmark, a tourist area (for example, a mountain, a waterfall, and a lake), a famous building (for example, a temple, a bridge), or a commercial facility such as a theme park and a shopping mall. On a computer process, the geographic feature may be a single point on a map or a region having an area. The information on the geographic feature may be set by default in the first map information 54, or may be acquired from a map server or the like through the Internet or the like. The route on the map is output to the MPU 60. The navigation device 50 may perform route guidance using the navigation HMI 52 on the basis of the route on the map. For example, the navigation device 50 may be realized by a function of a terminal device such as a smartphone or a tablet terminal possessed by the occupant. The navigation device 50 may transmit a current position and a destination to a navigation server through the communication device 20 and acquire the same route as the route on the map from the navigation server.

For example, the MPU 60 includes a recommended lane determination unit 61 and holds second map information 62 in the storage device such as an HDD or a flash memory. The recommended lane determination unit 61 divides the route on the map provided from the navigation device 50 into a plurality of blocks (for example, divides the route into intervals of 100 [m] in a vehicle progress direction), and determines a recommended lane for each block by referring to the second map information 62. The recommended lane determination unit 61 determines the number of a lane from the left that the vehicle travels in. In a case in which a branching position is present in the route on the map, the recommended lane determination unit 61 determines the recommended lane so that the subject vehicle M is able to travel on a reasonable travel route for progressing to a branch destination.

The second map information 62 is map information with accuracy higher than that of the first map information 54. For example, the second map information 62 may include information on the center of a lane, information on a boundary of a lane, or the like. The second map information 62 includes information on a position or number of traveling lanes, a position of an overtaking lane, joining and branching, and the like based on a road form. The traveling lane is, for example, a lane other than the overtaking lane among lanes on which the subject vehicle M is able to travel. The overtaking lane is, for example, a lane for overtaking a preceding vehicle that travels on the traveling lane and travels in front of the subject vehicle M. The overtaking lane is, for example, the rightmost lane in a case in which there are a plurality of lanes on one side. The second map information 62 may include traffic signs, road information, traffic regulation information, address information (an address and a postal code), facility information, telephone number information, and the like. The second map information 62 may be updated at any time by the communication device 20 communicating with another device.

The driving operation element 80 includes, for example, an acceleration pedal, a brake pedal, a shift lever, a steering wheel, a modified steering wheel, a joystick, and other operation elements. A sensor that detects an operation amount or presence or absence of an operation is attached to the driving operation element 80, and a detection result of the sensor is output to the automated driving control device 100, or a part or all of the traveling driving force output device 200, the brake device 210, and the steering device 220.

For example, the automated driving control device 100 includes a first control unit 120, a second control unit 160, an HMI control unit 180, and a storage unit 190. For example, each of constitution elements except for the storage unit 190 is realized by a hardware processor such as a central processing unit (CPU) executing a program (software). Some or all of such constitution elements may be realized by hardware (a circuit unit including a circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage unit 190 of the automated driving control device 100 in advance. Alternatively, the program may be stored in a detachable storage medium such as a DVD or a CD-ROM and may be installed in the storage unit 190 of the automated driving control device 100 as the storage medium is attached to the drive device. In addition, a combination of the action plan generation unit 140 and the second control unit 160 is an example of a "driving control unit". For example, the driving control unit controls one or both of the steering and the acceleration or deceleration of the subject vehicle M on the basis of the surrounding situation recognized by the recognition unit 130, a set vehicle speed of the subject vehicle M set by the occupant, and the like. The set vehicle speed is able to be allowed and set within a predetermined range (for example, about −20 to +20 [km/h]) on the basis of a speed indicated on a speed sign of the traveling lane. In the present embodiment, it is assumed that the driving control unit executes the driving control by giving priority to the set vehicle speed among the set vehicle speed and the speed indicated by the speed sign.

Figure 2:
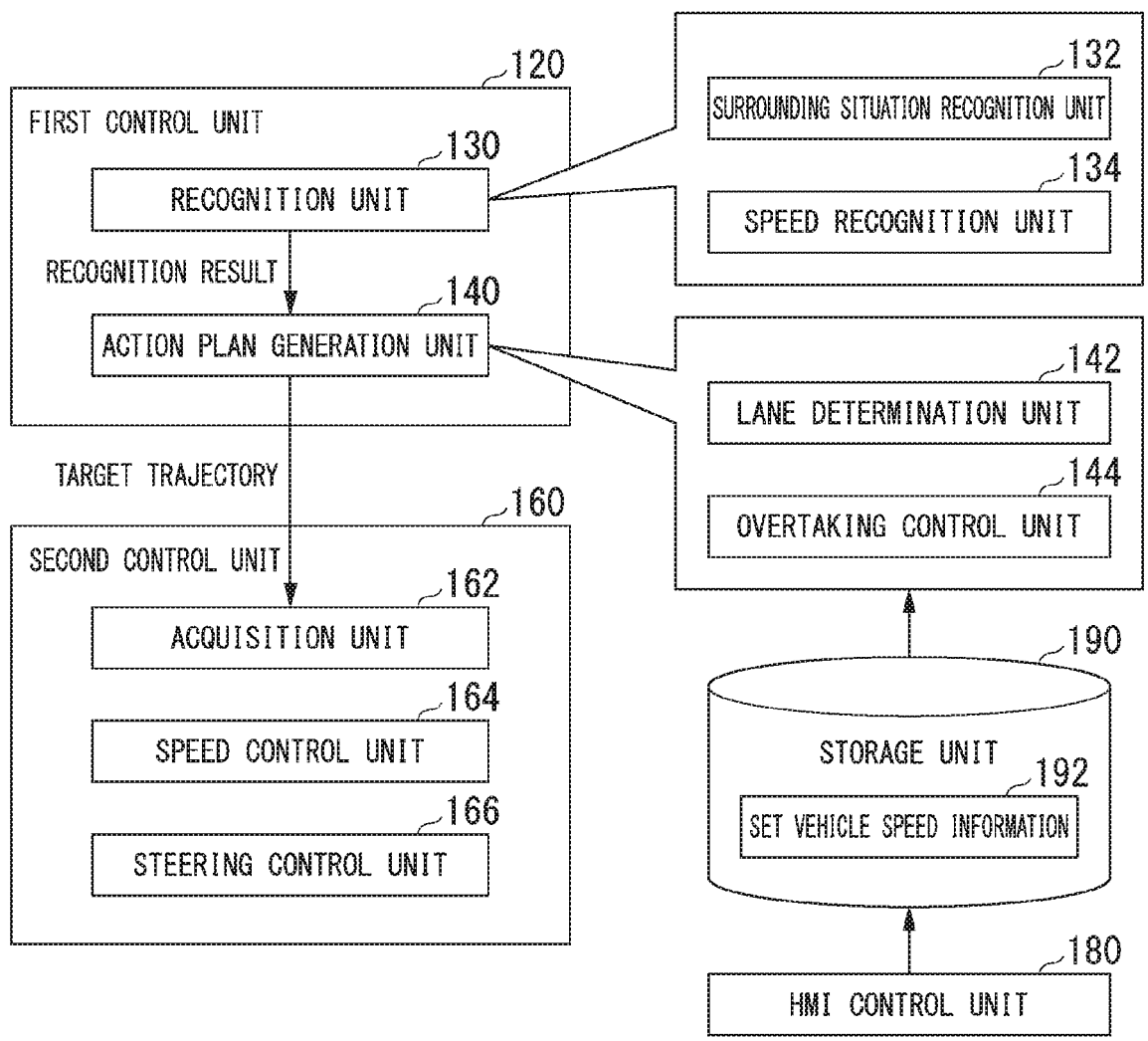
FIG. 2 is a functional constitution diagram of a first control unit, a second control unit, an HMI control unit, and a storage unit.

FIG. 2 is a functional constitution diagram of the first control unit 120, the second control unit 160, the HMI control unit 180, and the storage unit 190. For example, the first control unit 120 includes a recognition unit 130 and an action plan generation unit 140. For example, the first control unit 120 realizes a function of artificial intelligence (AI) and a function of a previously given model in parallel. For example, a function of "recognizing an intersection" may be realized by executing recognition of an intersection by deep learning or the like and recognition based on a previously given condition (there is a pattern matching signal, a road sign, or the like) in parallel, giving scores to both sides, and comprehensively evaluating the scores. Therefore, reliability of automated driving is guaranteed.

For example, the recognition unit 130 recognizes states such as the position, the speed, the orientation, and the acceleration of the object around the subject vehicle M, on the basis of information input from the camera 10, the radar device 12, and the finder 14 through the object recognition device 16. The object includes, for example, a moving object such as a pedestrian, or another vehicle, or an obstacle of a construction site or the like. The position of the object is recognized as a position in relative coordinates using a representative point (a center of gravity, a drive shaft center, or the like) of the subject vehicle M as an origin and is used in control. The position of the object may be represented by the representative point such as the center of gravity or a corner of the object, or may be represented by an expressed region. The "state" of the object may include the acceleration or a jerk of the object, or an "action state" (for example, whether or not the object is changing lanes or trying to change lanes).

For example, the recognition unit 130 recognizes a lane (traveling land) on which the subject vehicle M is traveling. For example, the recognition unit 130 recognizes the traveling lane by comparing a pattern of a road division line (for example, an arrangement of a solid line and a broken line) obtained from the second map information 62 with a pattern of a road division line around the subject vehicle M recognized from the image captured by the camera 10. The recognition unit 130 may recognize the traveling lane by recognizing a traveling road boundary (a road boundary) including a road division line, a road shoulder, a curb stone, a median strip, a guard rail, and the like, and is not limited to recognizing road division lines. In this recognition, the position of the subject vehicle M acquired from the navigation device 50 or a process result by an INS may be added. The recognition unit 130 may recognize a width, a height, a shape, or the like of the obstacle on the basis of the image captured by the camera 10. The recognition unit 130 recognizes a sidewalk, a temporary stop line, an obstacle, a red light, a toll gate, a road structure, and other road events.

When recognizing the traveling lane, the recognition unit 130 recognizes the position and a posture of the subject vehicle M with respect to the traveling lane. For example, the recognition unit 130 may recognize a deviation of a reference point of the subject vehicle M from a center of the lane and an angle formed by a line connecting the center of the lane of a progress direction of the subject vehicle M as a relative position and the posture of the subject vehicle M with respect to the traveling lane. Instead of this, the recognition unit 130 may recognize a position of the reference point of the subject vehicle M with respect to one of side end portions (the road division line or the road boundary) of the traveling lane as the relative position of the subject vehicle M with respect to the traveling lane. The recognition unit 130 may recognize a structure (for example, a utility pole, a median strip, and the like) on the road on the basis of the first map information 54 or the second map information 62. A function of a surrounding situation recognition unit 132 and a speed recognition unit 134 of the recognition unit 130 will be described later.

The action plan generation unit 140 generates a target trajectory along which the subject vehicle M automatically (without depending on the operation of the driver) travels in the future so that the subject vehicle M travels on the recommended lane determined by the recommended lane determination unit 61 in principle and furthermore the subject vehicle M is able to cope with the surrounding situation of the subject vehicle M. The target trajectory includes, for example, a speed element. For example, the target trajectory is expressed as a sequence of points (trajectory points) where the subject vehicle M reaches. The trajectory point is a point where the subject vehicle M reaches for each predetermined traveling distance (for example, about several [m]) at a road distance, and separately from that, a target speed and a target acceleration for each predetermined sampling time (for example, about 0 comma several [sec]) are generated as part of the target trajectory. The trajectory point may be a position where the subject vehicle M reaches at a sampling time for each predetermined sampling time. In this case, information on the target speed and the target acceleration is expressed by an interval between the trajectory points.

In generating the target trajectory, the action plan generation unit 140 may set an event of the automated driving. The event of the automated driving includes a constant speed traveling event, a low speed following traveling event, a lane change event, a branch event, a join event, a takeover event, an avoidance event, and the like. The action plan generation unit 140 generates a target trajectory according to an activated event. A function of a lane determination unit 142 and an overtaking control unit 144 of the action plan generation unit 140 will be described later.

The second control unit 160 controls the traveling driving force output device 200, the brake device 210, and the steering device 220 so that the subject vehicle M passes through the target trajectory generated by the action plan generation unit 140 at a scheduled time.

For example, the second control unit 160 includes an acquisition unit 162, a speed control unit 164, and a steering control unit 166. The acquisition unit 162 acquires information on the target trajectory (a trajectory point) generated by the action plan generation unit 140 and stores the information in a memory (not shown). The speed control unit 164 controls the traveling driving force output device 200 or the brake device 210 on the basis of a speed element accompanying the target trajectory stored in the memory. The steering control unit 166 controls the steering device 220 according to a degree of curvature of the target trajectory stored in the memory. For example, a process of the speed control unit 164 and the steering control unit 166 is realized by a combination of a feed-forward control and a feedback control. As an example, the steering control unit 166 is executed by a combination of a feed-forward control according to a curvature of the road ahead of the subject vehicle M and a feedback control based on the deviation from the target trajectory.

The HMI control unit 180 notifies the occupant of predetermined information by the HMI 30. The predetermined information is, for example, information related to the traveling of the subject vehicle M, such as information for imposing a required task on the occupant, and information for causing the occupant to operate the driving operation element 80. The predetermined information may include information that is not related to the traveling of the subject vehicle M, such as a television program and contents (for example, a movie) stored in a storage medium such as a DVD. The information received by the HMI 30 is output to the communication device 20, the navigation device 50, the first control unit 120, and the like.

For example, the storage unit 190 is realized by a non-volatile storage device such as a read only memory (ROM), an electrically erasable and programmable read only memory (EEPROM), and an HDD, or a volatile storage device such as a random access memory (RAM) and a register. The storage unit 190 stores, for example, set vehicle speed information 192 including information on the vehicle speed of the subject vehicle M set by the occupant by the HMI 30, and other information.

The traveling driving force output device 200 outputs, to driving wheels, traveling driving force (torque) for enabling the vehicle to travel. For example, the traveling driving force output device 200 includes a combination of an internal combustion engine, an electric motor, a transmission, and the like, and an electronic control unit (ECU) that controls the internal combustion engine, the electric motor, the transmission, and the like. The ECU controls the above-described constitutions according to the information input from the second control unit 160 or the information input from the driving operation element 80.

For example, the brake device 210 includes a brake caliper, a cylinder that transfers oil pressure to the brake caliper, an electric motor that generates the oil pressure in the cylinder, and a brake ECU. The brake ECU controls the electric motor according to the information input from the second control unit 160 or the information input from the driving operation element 80, so that a brake torque according to a control operation is output to each wheel. The brake device 210 may include a mechanism for transferring the oil pressure generated by an operation of a brake pedal included in the driving operation element 80 to the cylinder through a master cylinder as a backup. The brake device 210 is not limited to the constitution described above, and may be an electronic control method oil pressure brake device that controls an actuator according to the information input from the second control unit 160 to transfer the oil pressure of the master cylinder to the cylinder.

For example, the steering device 220 includes a steering ECU and an electric motor. For example, the electric motor changes a direction of steerable wheels by applying a force to a rack and pinion mechanism. The steering ECU changes the direction of the steerable wheels by driving the electric motor according to the information input from the second control unit 160 or the information input from the driving operation element 80.

[Function of Surrounding Situation Recognition Unit]

The surrounding situation recognition unit 132 recognizes the surrounding situation of the subject vehicle M on the basis of the information input from the camera 10 or the like through the object recognition device 16. The surrounding situation of the subject vehicle M includes, for example, the position and the vehicle speed of the subject vehicle M, the positions and the vehicle speeds of other vehicles within a predetermined range centered on the position of the subject vehicle M, and the road form.

Figure 3:
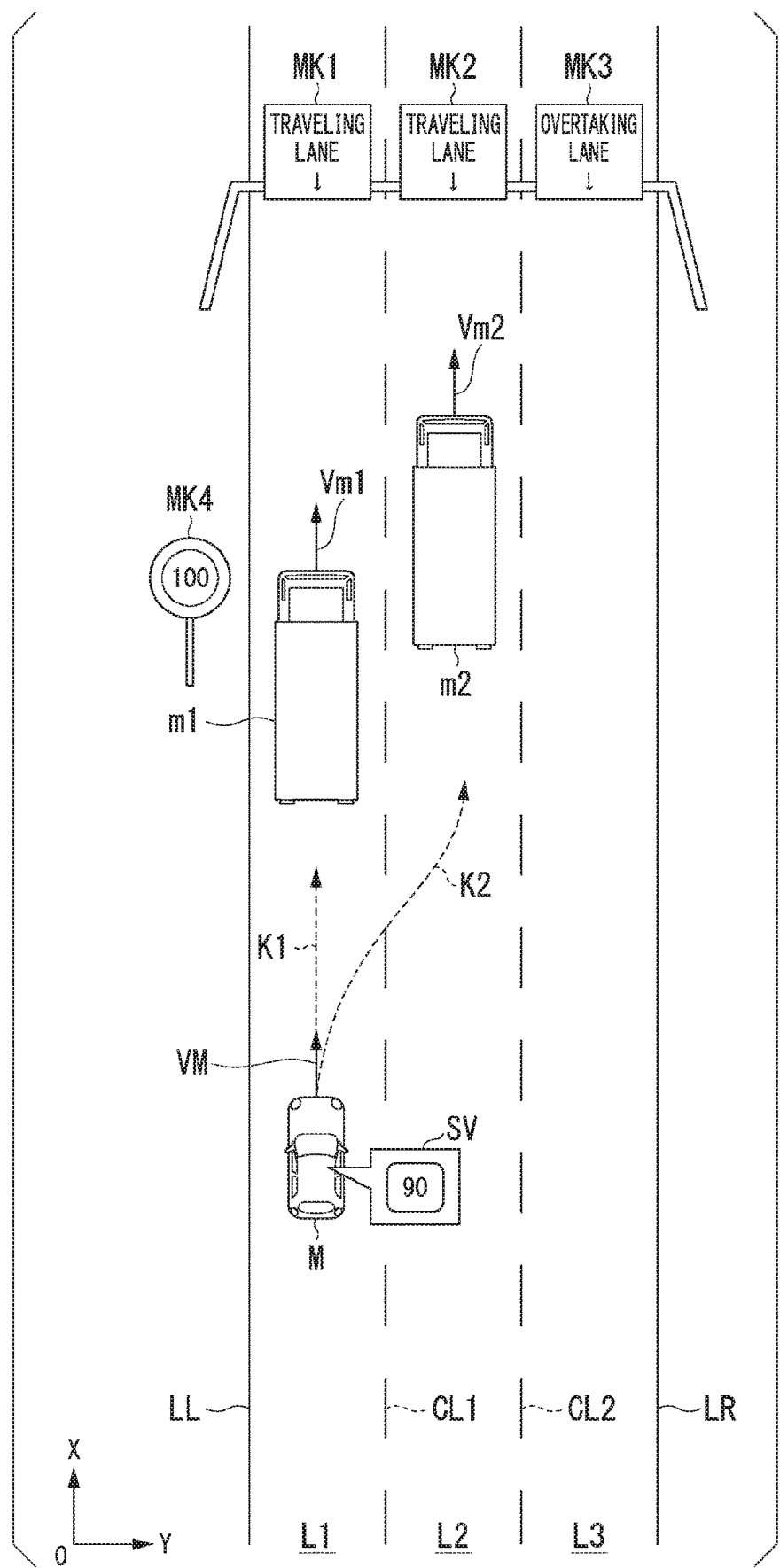
FIG. 3 is a diagram for explaining a process of a surrounding situation recognition unit.

FIG. 3 is a diagram for explaining a process of the surrounding situation recognition unit 132. In an example of FIG. 3, a plurality of lanes L1 to L3 where the subject vehicle M is able to travel in the progress direction of the subject vehicle M (a road extension direction, an X axis direction in the figure) are shown. It is assumed that the subject vehicle M is traveling on the leftmost lane L1 among lanes L1 to L3 divided by the road division lines LL, CL1, CL2, and LR at a vehicle speed VM. It is assumed that another vehicle m1 is traveling on the lane L1 at a vehicle speed Vm1, and another vehicle m2 travels on the lane L2 at a vehicle speed Vm2. In the example of FIG. 3, the other vehicles m1 and m2 indicate large vehicles (trucks), but the type of vehicle is not particularly limited.

The surrounding situation recognition unit 132 recognizes the lanes L1 to L3 on the basis of the information input from the camera 10 or the like through the object recognition device 16, and recognizes lane types (the traveling lane and the overtaking lane) of the lanes L1 to L3 by the traffic signs MK1 to MK3. The traffic sign is, for example, a marking board indicating traffic regulation of a road on which the vehicle travels, and includes a regulation sign, an instruction sign, a warning sign, a guide sign, and the like. The traffic sign may be installed near the road (lane), or may be temporarily placed in the vicinity of a construction site or in the vicinity of an accident vehicle on the road. The traffic sign may be drawn on a road surface of the road. In the example of FIG. 3, by recognizing characters of the traffic signs MK1 to MK3, the surrounding situation recognition unit 132 recognizes the lanes L1 and L2 as the traveling lanes, and recognizes the lane L3 as the overtaking lane. The surrounding situation recognition unit 132 may recognize the lane types of the lanes L1 to L3 by collating the position information of the subject vehicle M with the map information (the first map information 54 or the second map information 62).

The surrounding situation recognition unit 132 recognizes the positions and the vehicle speeds Vm1 and Vm2 of the surrounding vehicles m1 and m2 on the basis of the information input from the camera 10 or the like through the object recognition device 16. The surrounding situation recognition unit 132 may recognize detailed information such as a type (for example, an automobile road, an expressway, or a general road) of a road on which the vehicle travels, or whether or not the traveling lane or the overtaking lane is separated from an oncoming lane by a median strip or the like, from the traffic sign included in the image.

[Function of Speed Recognition Unit]

The speed recognition unit 134 recognizes a speed mark MK4 of the lane on which the subject vehicle M travels on the basis of the information input from the camera 10 or the like through the object recognition device 16. The speed mark MK4 is, for example, a marking board that indicates a speed restriction (for example, a legal speed or a speed limit) of the traveling lane, and the like, and is an example of the traffic sign. The speed mark MK4 may be installed, for example, in the vicinity of the lanes L1 to L3 or may be temporarily placed in the vicinity of a construction site or an accident vehicle on the road. The speed sign MK4 may be drawn on the road surface of the road. The speed recognition unit 134 recognizes information (hereinafter referred to as speed sign information) on the speed limit of the lane from the speed sign. In the example of FIG. 3, the speed recognition unit 134 analyzes character information of the speed sign MK4 and recognizes 100 [km/h] as the speed sign information.

For example, the speed recognition unit 134 may recognize the speed sign information of the road on which the subject vehicle M is traveling or a road on which the subject vehicle M is supposed to travel in the future, by referring to the map information (for example, the first map information 54 or the second map information 62) on the basis of the position information of the subject vehicle M.

The speed recognition unit 134 recognizes traffic flow speed information of the lanes L1 to L3 on the basis of the vehicle speeds of the other vehicles present on the lanes L1 to L3 recognized by the surrounding situation recognition unit 132. The other vehicles present on the lanes L1 to L3 may include, for example, a preceding vehicle, a rear vehicle, and a parallel traveling vehicle of the subject vehicle M. The traffic flow speed information is, for example, an average vehicle speed of the other vehicles. In the example of FIG. 3, the speed recognition unit 134 recognizes the traffic flow speed information ((Vm1+Vm2)/2) of the lanes L1 to L3 on the basis of the vehicle speeds Vm1 and Vm2 of the other vehicles m1 and m2 present on the lanes L1 to L3. The speed recognition unit 134 may recognize the traffic flow speed information for each of the lanes L1 to L3 or may recognize the traffic flow speed information by distinguishing between the traveling lane and the overtaking lane.

[Function of Lane Determination Unit]

In a case in which it is recognized by the surrounding situation recognition unit 132 that there are a plurality of traveling lanes on which the subject vehicle M is able to travel in the progress direction of the subject vehicle M, the lane determination unit 142 determines the lane (the recommended lane) on which the subject vehicle M travels among the plurality of traveling lanes on the basis of the set vehicle speed set by the occupant. For example, the set vehicle speed is received by the HMI 30 and stored in the storage unit 190 as the set vehicle speed information 192.

In a case in which there are three or more lanes including two or more traveling lanes on which the subject vehicle M is able to travel in the progress direction of the subject vehicle M and the overtaking lane, the lane determination unit 142 determines the lane on which the subject vehicle M travels among the three or more lanes on the basis of the set vehicle speed. In the example of FIG. 3, it is assumed that the set vehicle speed SV of the subject vehicle M is 90 [km/h]. In this case, the lane determination unit 142 compares the set vehicle speed SV with a threshold value, and in a case in which the set vehicle speed SV is less than the threshold value, the lane determination unit 142 determines that the subject vehicle M travels on the lane and generates a target trajectory K1 for causing the subject vehicle M to travel on the lane L1. In a case in which the set vehicle speed SV is equal to or greater than the threshold value, the lane determination unit 142 determines that the subject vehicle M travels on the lane L2 and generates a target trajectory K2 for causing the subject vehicle M to change the lane to the lane L2. As described above, in a case in which there are the plurality of traveling lanes, since the subject vehicle M is caused to travel on the lane based on the set vehicle speed, it is possible to realize driving control adapted for a road environment.

The lane determination unit 142 may determine the lane on which the subject vehicle M travels on the basis of a result of a comparison between the set vehicle speed of the subject vehicle M and the speed sign information or the traffic flow speed information of the traveling lane among a plurality of traveling lanes. For example, in the example of FIG. 3, the lane determination unit 142 compares the set vehicle speed SV with the speed sign information obtained from the speed mark MK4, and in a case in which the set vehicle speed is less than a speed of the speed sign information, the lane determination unit 142 generates the target trajectory K1 for causing the subject vehicle M to travel on the lane L1, and in a case in which the set vehicle speed is equal to or greater than the speed of the speed sign information, the lane determination unit 142 generates the target trajectory K2 for causing the subject vehicle M to travel on the lane L2. The lane determination unit 142 compares the set vehicle speed SV with the traffic flow speed information, and in a case in which the set vehicle speed is less than a speed of the traffic flow speed information, the lane determination unit 142 generates the target trajectory K1 for causing the subject vehicle M to travel on the lane L1, and in a case in which the set vehicle speed is equal to or greater than the speed of the traffic flow speed information, the lane determination unit 142 generates the target trajectory K2 for causing the subject vehicle M to travel on the lane L2. In the example of FIG. 3, since the set vehicle speed SV is 90 [km/h] and the speed sign information obtained from the speed sign MK4 is 100 [km/h], the lane determination unit 142 generates the target trajectory K1 for causing the subject vehicle M to travel on the lane L1. Therefore, the driving control unit is able to realize the driving control adapted for the road environment.

In a case in which the subject vehicle M travels on a plurality of traveling lanes and a preceding vehicle traveling in front of the subject vehicle M on the traveling lane on which the subject vehicle M travels is recognized by the surrounding situation recognition unit 132, the lane determination unit 142 may determine the lane on which the subject vehicle M travels. Therefore, since it is possible to suppress the lane change in a case in which there is no preceding vehicle, it is possible to maintain a stable traffic flow with respect to a following vehicle.

Figure 4:
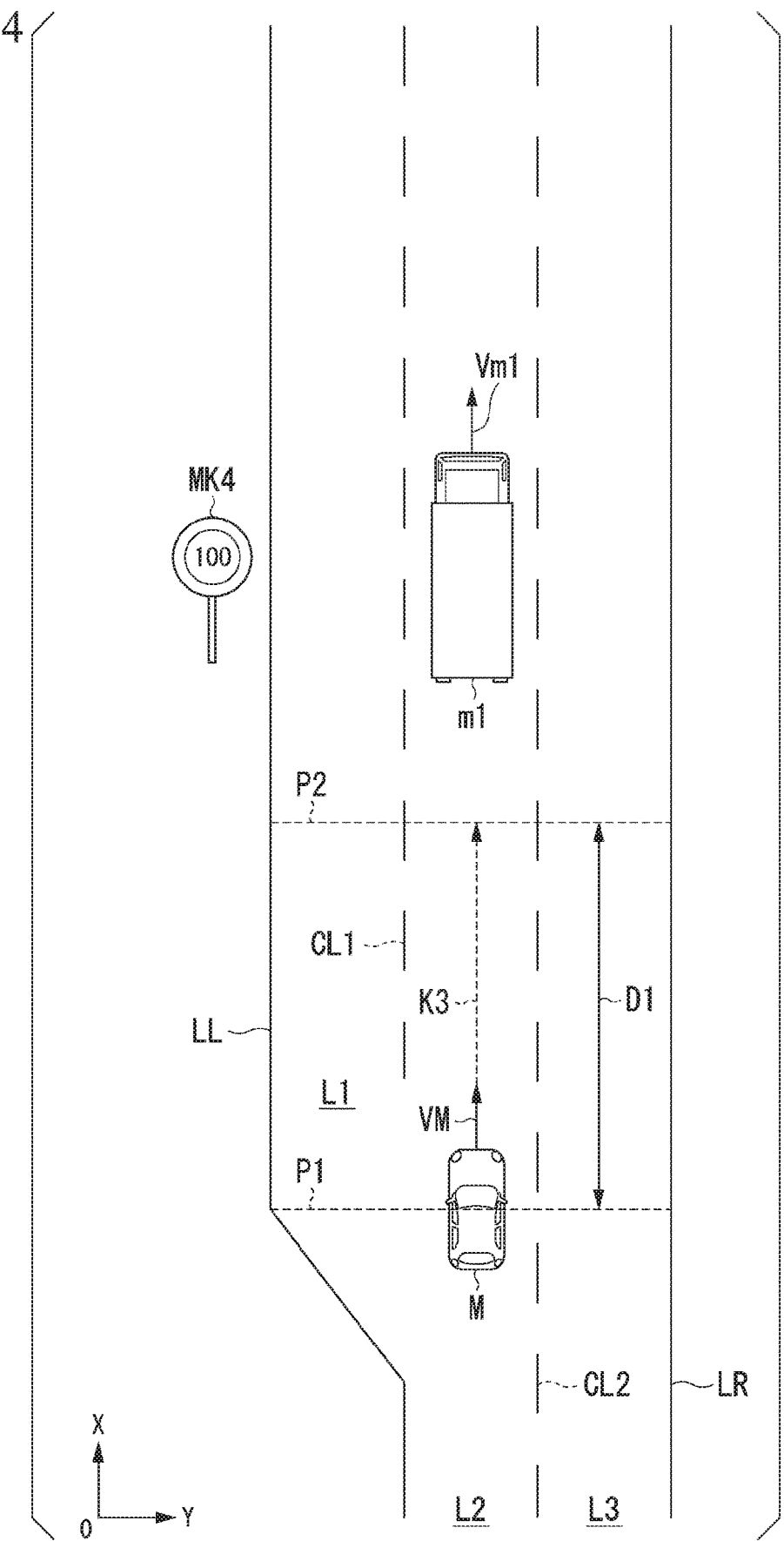
FIG. 4 is a diagram for explaining a process of a lane determination unit based on an increase in a traveling lane.

In a case in which the number of traveling lanes recognized by the surrounding situation recognition unit 132 increases, the lane determination unit 142 may suppress the lane change of the subject vehicle M until the subject vehicle M travels a predetermined distance from a point at which the number of traveling lanes increases. FIG. 4 is a diagram for explaining a process of the lane determination unit 142 based on the increase in the number of traveling lanes. In an example of FIG. 4, a situation in which the traveling lane (the lane L1) on a left side of the lane L2 of the two lanes (L2 and L3) increases and is to be a road with three lanes is shown. It is assumed that the subject vehicle M and the other vehicle m1 travel on the lane L2. A point P1 indicates the point at which the traveling lane has increased.

In this situation, the lane determination unit 142 suppresses the lane change of the subject vehicle M until the subject vehicle M travels the predetermined distance D1 after the subject vehicle M passes through the point P1 at which the number of lanes increases, and generates a target trajectory K3 for causing the subject vehicle M to travel by maintaining the lane L2 on which the subject vehicle M is traveling. In addition, in a case in which the subject vehicle M passes through a point P2, which is the predetermined distance D1 ahead of the point P1, the lane determination unit 142 cancels the suppression of the lane change of the subject vehicle M (makes the lane change possible).

The lane determination unit 142 may suppress the lane change of the subject vehicle M until a predetermined time has elapsed after the subject vehicle M passes through the point P1 at which the number of lanes has increased. In addition, the lane determination unit 142 cancels the suppression of the lane change of the subject vehicle M in a case in which the predetermined time has elapsed. As described above, by suppressing the lane change on the basis of the increase in the number of lanes, for example, in a case in which the number of lanes increases, the traveling speed of the surrounding vehicle may change, and the set vehicle speed SV of the subject vehicle M may change. Therefore, it is possible to perform more stable traveling by maintaining the traveling lane until the subject vehicle M travels the predetermined distance or until the subject vehicle M travels for the predetermined time. It is possible to reduce the anxiety of the occupant due to the lane change immediately after the increase in the number of lanes.

Figure 5:
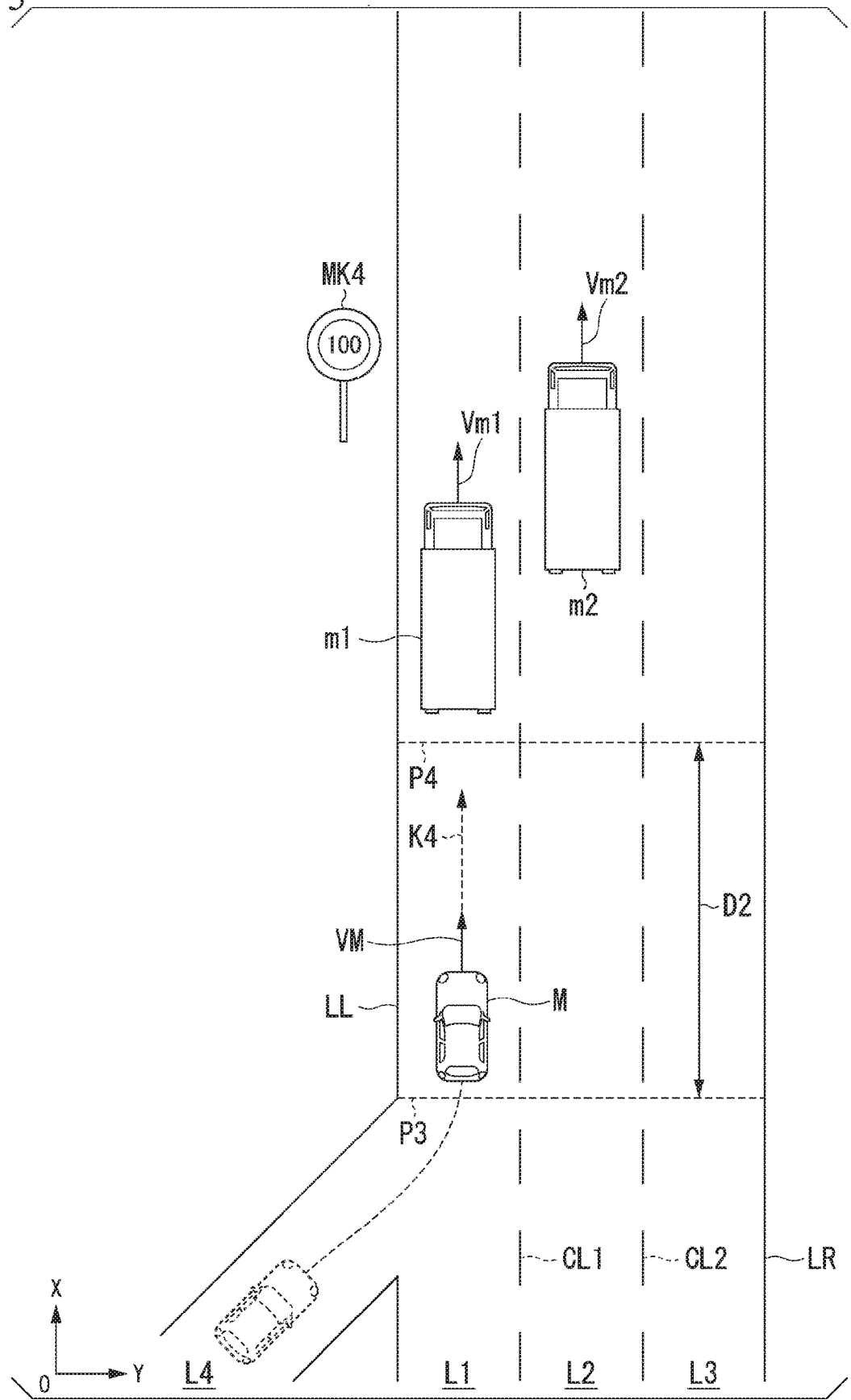
FIG. 5 is a diagram for explaining a process of the lane determination unit based on a traveling distance of a lane.

In a case in which a traveling distance of the lane on which the subject vehicle M is traveling is equal to or less than a predetermined distance, the lane determination unit 142 may suppress the execution of the lane change. FIG. 5 is a diagram for explaining a process of the lane determination unit 142 based on the traveling distance of the lane. An example of FIG. 5 shows a situation in which the subject vehicle M joins the lanes of the above-described lanes L1 to L3 from the lane L4 on which the subject vehicle M is traveling. A point P3 indicates a point at which joining the lanes L1 to L3 is started.

In this situation, the lane determination unit 142 suppresses the lane change of the subject vehicle M until the subject vehicle M travels a predetermined distance D2 after passing through the joining point P3, and generates a target trajectory K4 for causing the subject vehicle M to travel while maintaining a lane L1 (a lane present at the leftmost) after the joining. In addition, in a case in which the subject vehicle M passes through a point P4 ahead of the point P3 by the predetermined distance D2, the lane determination unit 142 cancels the suppression of the lane change of the subject vehicle M (enables the lane change).

The lane determination unit 142 may suppress the lane change of the subject vehicle M until a traveling time after the subject vehicle M passes through the joining point P3 exceeds a predetermined time. In addition, in a case in which the traveling time has elapsed the predetermined time, the lane determination unit 142 cancels the suppression of the lane change of the subject vehicle M. In addition to the time of the joining shown in FIG. 5, for example, the lane determination unit 142 may perform similar control in a case in which a road after turning to the left or right of an intersection point is the above-described lanes L1 to L3. The lane determination unit 142 may store a traveling history of the lane or the like on which the subject vehicle M traveled in the past in the storage unit 190, and in a case in which the number of times of the traveling at the same point reaches a predetermined number of times or more, the lane determination unit 142 may reduce one or both of the predetermined distance D1 or D2 and the predetermined time described above. The predetermined number of times may be set in a stepwise manner. For example, in a case in which the number of times of the traveling at the same point is five or more, the lane determination unit 142 makes one or both of the predetermined distance D1 or D2 and the predetermined time shorter than a reference value. Furthermore, in a case in which the number of times of the traveling at the same point is ten or more, the lane determination unit 142 makes one or both of the predetermined distance D1 or D2 and the predetermined time further shorter in comparison with a case in which the number of times of the traveling at the same point is five or more. The lane determination unit 142 may change one or both of the predetermined distance D1 or D2 and the predetermined time according to the number of traveling vehicles in the vicinity of the subject vehicle M. For example, in a case in which the number of the traveling vehicles in the vicinity of the subject vehicle M is equal to or less than a predetermined number, the lane determination unit 142 shortens one or both of the predetermined distance D1 or D2 and the predetermined time. The lane determination unit 142 may statistically learn the history information (for example, the frequency) of the lane change by the operation of the occupant, and may determine the traveling lane on the basis of a learning result. The lane change by the operation of the occupant is, for example, a lane change at the time of manual driving, and an automated lane change by blinker operation.

Therefore, for example, in a case in which traveling of the lanes L1 to L3 is started after the joining or the turning to the right or left of the intersection point, immediate execution of the lane change is suppressed. Thus, stable traveling is possible, and it is possible to reduce the anxiety of the occupant due to the execution of the overtaking control after the road environment changes.

[Function of Overtaking Control Unit]

Figure 6:
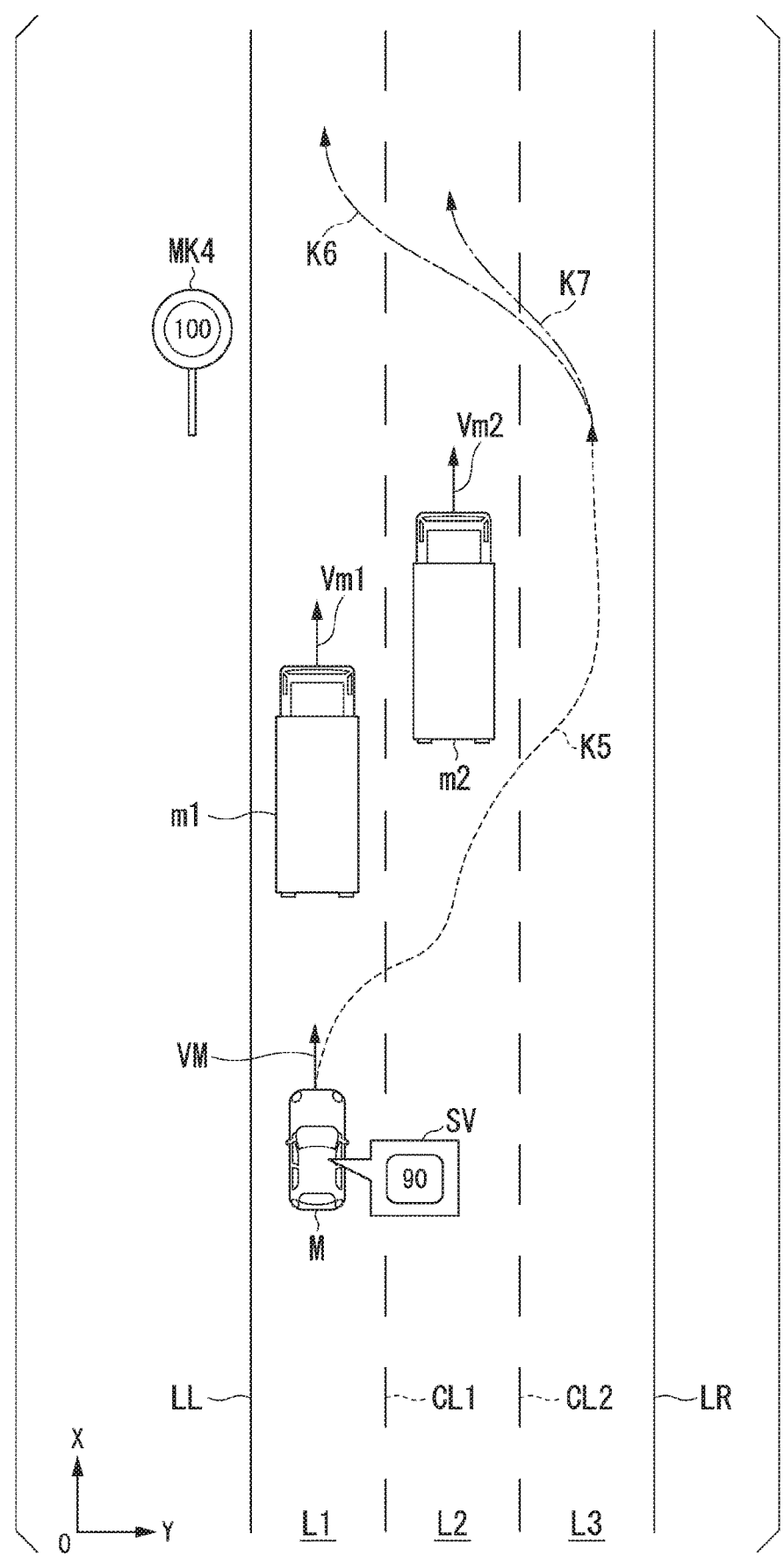
FIG. 6 is a diagram for explaining a process of an overtaking control unit.

In a case in which the subject vehicle M travels on a traveling lane among three or more lanes including two or more traveling lanes and an overtaking lane, the overtaking control unit 144 may determine whether or not to cause the subject vehicle M to overtake the preceding vehicle on the basis of a traveling situation of the preceding vehicle. FIG. 6 is a diagram for explaining a process of the overtaking control unit 144. In an example shown in FIG. 6, it is assumed that the subject vehicle M travels on the lane at the vehicle speed VM, the other vehicle m1 travels on the lane at the vehicle speed Vm1, and the other vehicle m2 travels on the lane L2 at the vehicle speed Vm2.

The overtaking control unit 144 determines whether or not the vehicle speeds Vm1 and Vm2 of the other vehicles m1 and m2 are less than the vehicle speed VM of the subject vehicle M. In a case in which the vehicle speeds Vm1 and Vm2 of the other vehicles m1 and m2 are equal to or greater than the vehicle speed VM of the subject vehicle M, the overtaking control unit 144 determines not to execute control to cause the subject vehicle M to overtake the other vehicles m1 and m2. In a case in which the vehicle speeds Vm1 and Vm2 of the other vehicles m1 and m2 are less than the vehicle speed VM of the subject vehicle M, the overtaking control unit 144 determines whether or not a speed difference between the vehicle speeds Vm1 and Vm2 of the other vehicles m1 and m2 and the vehicle speed VM or the set vehicle speed SV of the subject vehicle M is equal to or greater than a threshold value. In a case in which the speed difference is less than the threshold value, the overtaking control unit 144 determines not to execute the control to cause the subject vehicle M to overtake the other vehicles m1 and m2. In a case in which the vehicle speed VM or the set vehicle speed SV of the subject vehicle M is equal to or greater than the threshold value, the overtaking control unit 144 determines to cause the subject vehicle M to overtake the other vehicles m1 and m2, and generates a target trajectory K5 for causing the subject vehicle M to overtake the other vehicles m1 and m2 by the lane change from the traveling lane (the lane L1) of the subject vehicle M to the overtaking lane (the lane L3). In a case in which the overtaking driving control is performed, the vehicle speed VM of the subject vehicle M when traveling on the lane L3 is faster than the vehicle speeds Vm1 and Vm2 of the other vehicles m1 and m2.

The overtaking control unit 144 executes the overtaking driving control for causing the subject vehicle M to travel along the target trajectory K5, and determines the lane of the lanes L1 or L2 to which the subject vehicle M is caused to return after the execution of the overtaking driving control. For example, in a case in which the set vehicle speed SV is less than the speed of the speed sign information, the overtaking control unit 144 determines that the subject vehicle M is caused to return to the lane L1, and generates a target trajectory K6 for causing the subject vehicle M to change the lane from the L3 to the lane L1. In a case in which the set vehicle speed SV is equal to or greater than the speed of the speed sign information, the overtaking control unit 144 determines that the subject vehicle M is caused to return to the lane L2, and generates a target trajectory K7 for causing the subject vehicle M to change the lane from the lane L3 to the lane L2. The overtaking control unit 144 may compare each of the vehicle speeds Vm1 and Vm2 of the other vehicles m1 and m2 with the vehicle speed VM of the subject vehicle M, and may generate a target trajectory for changing the lane to a lane on which the other vehicle travels with the higher speed.

Figure 7:
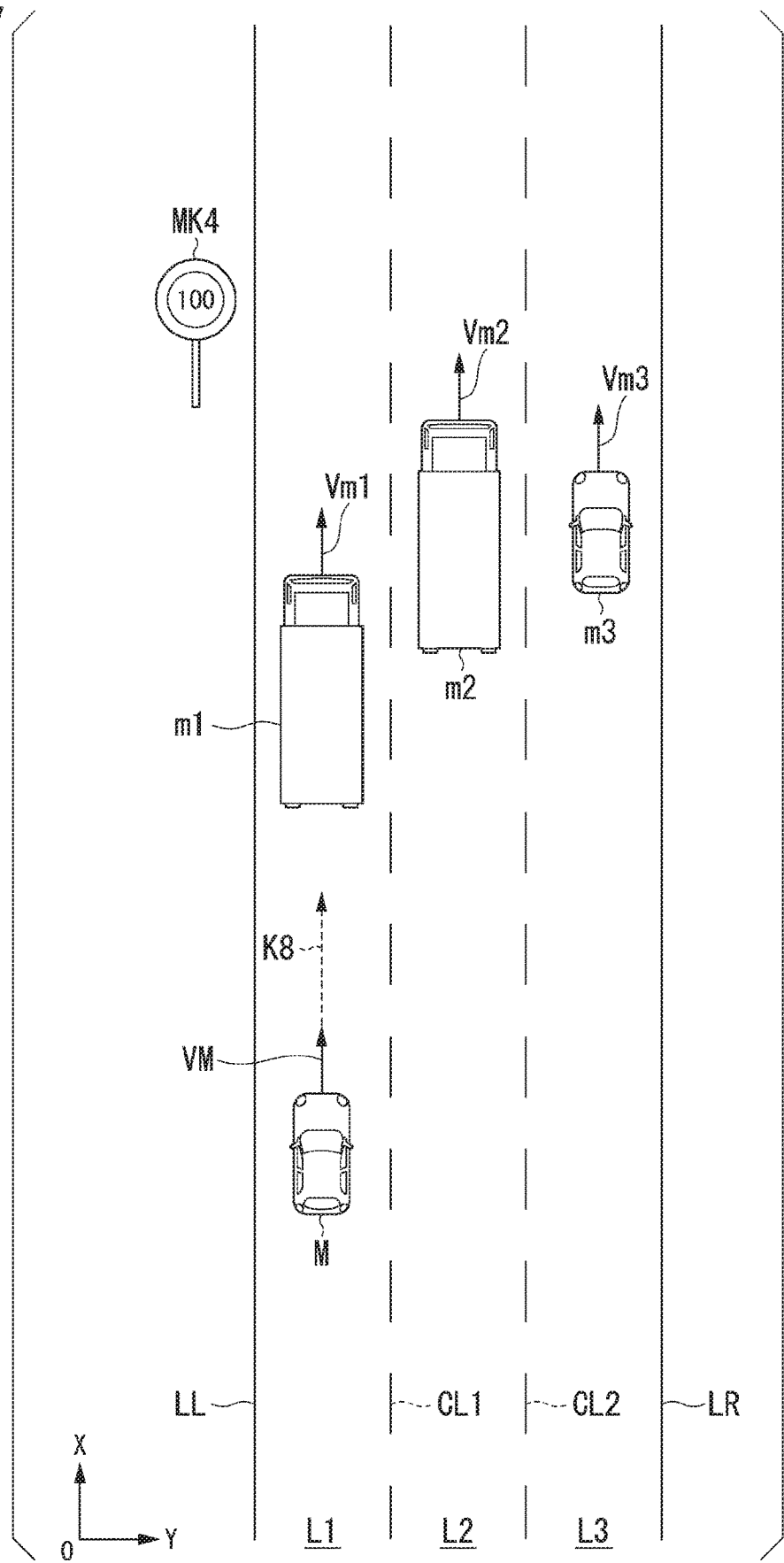
FIG. 7 is a diagram for explaining the process of the overtaking control unit in a case in which there is another vehicle on an overtaking lane.

In a case in which there is another vehicle traveling on the lane L3 among the other vehicles recognized by the surrounding situation recognition unit 132, the overtaking control unit 144 controls the execution of the lane change in the overtaking driving. FIG. 7 is a diagram for explaining the process of the overtaking control unit 144 in a case in which there is the other vehicle on the overtaking lane. In an example of FIG. 7, the other vehicles m1 to m3 are vehicles traveling ahead of the subject vehicle M, respectively. In the example of FIG. 7, it is assumed that the other vehicle m1 travels on the lane L1, the other vehicle m2 travels on the lane L2, and the other vehicle m3 travels on the lane L3.

For example, the overtaking control unit 144 determines whether or not the vehicle speed Vm3 of the other vehicle m3 traveling on the lane L3 is equal to or less than the speed of the speed sign information or is equal to or less than the vehicle speed VM of the subject vehicle M. In a case in which the vehicle speed Vm3 of the other vehicle m3 is equal to or less than the speed of the speed sign information or is equal to or less than the vehicle speed VM of the subject vehicle M, since the other vehicle m3 is traveling ahead of the subject vehicle M even though the subject vehicle M tries to overtake the other vehicle m1 or m2 that are overtaking targets, the vehicle is not able to accelerate at a speed equal to or greater than the vehicle speed V3, and the overtaking may not be smoothly performed. Therefore, in a case in which the vehicle speed Vm3 of the other vehicle m3 is equal to or less than the speed of the speed sign information or is equal to or less than the vehicle speed VM of the subject vehicle M, the overtaking control unit 144 suppresses the lane change in the driving control for causing the subject vehicle M to overtake the other vehicles m1 and m2, and generates a target trajectory K8 for causing the subject vehicle M to continuously travel on the currently traveling lane L1. In a case in which the vehicle speed Vm3 is not equal to or less than the speed of the speed sign information or is not equal to or less than the vehicle speed VM of the subject vehicle M, the overtaking control unit 144 executes the lane change from the lane L1 to the lane L3 in order to cause the subject vehicle M to overtake the other vehicles m1 and m2.

Even though the vehicle speed Vm3 of the other vehicle m3 traveling on the overtaking lane L3 is equal to or less than the speed of the speed sign information or is equal to or less than the vehicle speed VM of the subject vehicle M, in a case in which the vehicle speed Vm3 of the other vehicle m3 is faster than the vehicle speeds Vm1 and Vm2 of the other vehicles m1 and m2 of the overtaking targets, the overtaking control unit 144 may execute the lane change from the lane L1 to the lane L3 in order to cause the subject vehicle M to overtake the other vehicles m1 and m2. This is because even though a maximum value of the vehicle speed VM of the subject vehicle M is limited to the vehicle speed Vm3 of the other vehicle m3, in a case in which the vehicle speed Vm3 is faster than the vehicle speeds Vm1 and Vm2, the subject vehicle M is able to overtake the vehicles m1 and m2. As described above, the overtaking control unit 144 is able to execute more appropriate overtaking driving control according to the traveling situation of the other vehicle m3 traveling on the overtaking lane (the lane L3).

Figure 8:
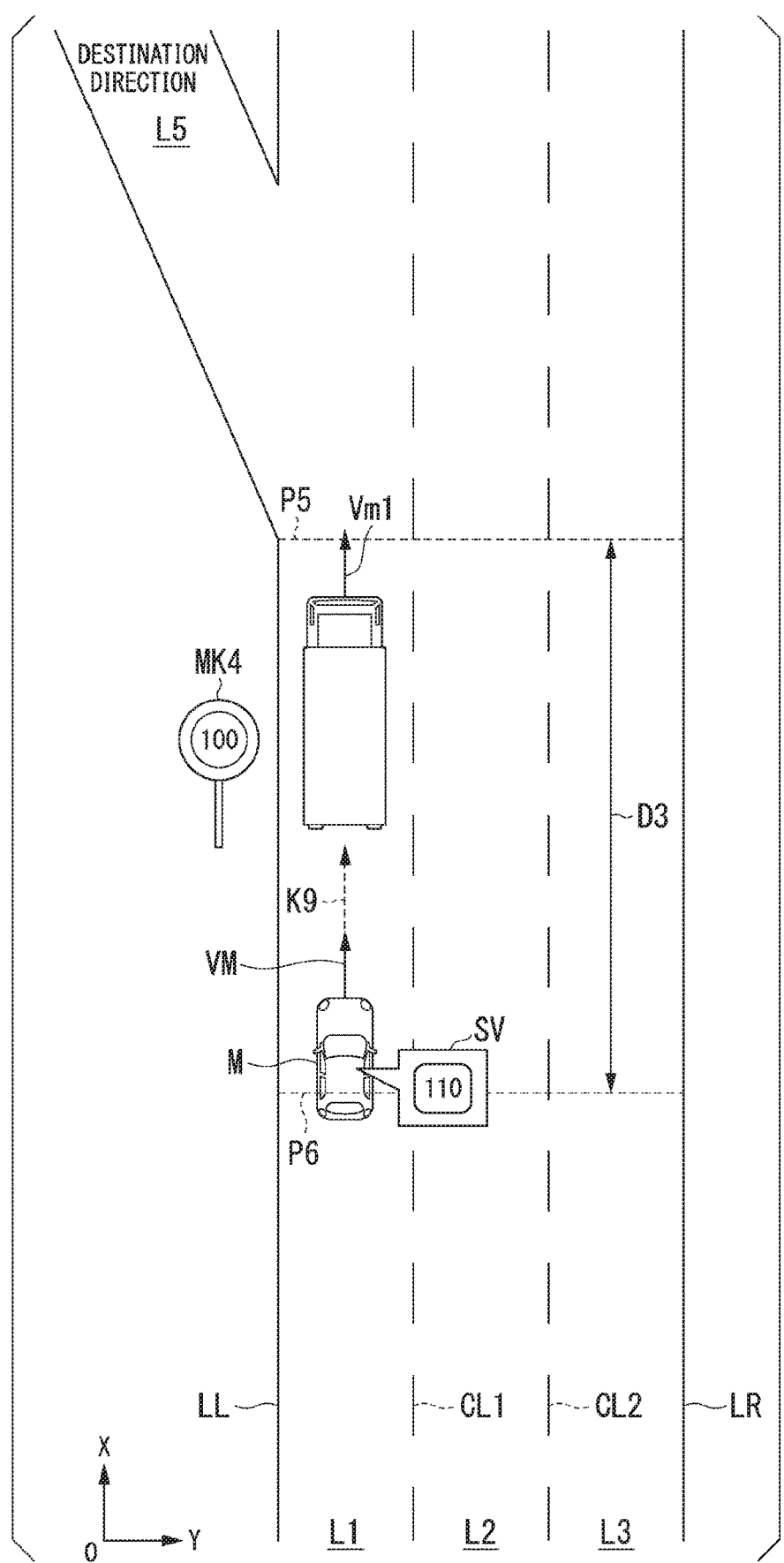
FIG. 8 is a diagram for explaining the process of the lane determination unit based on a traveling route.

In the processes of the lane determination unit 142 and the overtaking control unit 144 in the present embodiment, in a case in which the lane based on the traveling route to the destination of the subject vehicle M determined by the route determination unit 53 of the navigation device 50 and lane determined on the basis of the set vehicle speed SV are different from each other, a lane based on the traveling route may be prioritized. FIG. 8 is a diagram for explaining the process of the lane determination unit 142 based on the traveling route. In an example of FIG. 8, it is assumed that a lane L5 branched from the lane L1 is a lane heading to the destination of the subject vehicle M determined by the route determination unit 53 of the navigation device 50. In the example of FIG. 8, it is assumed that the subject vehicle M travels on the lane L1 at the vehicle speed VM, and the other vehicle m1 travels on the lane L1 at the vehicle speed Vm1. A point P5 is a point at which a lane change from the lane L1 to the lane L5 is started. When passing through the point P5, the subject vehicle M is required to start the lane change from the lane L1 to the lane L5.

In this case, the lane determination unit 142 compares the speed (100 [km/h]) of the speed mark MK4 with the set vehicle speed SV (110 [km/h]). Since the set vehicle speed SV is faster than the speed of the speed mark MK4, although it is determined that the subject vehicle M is caused to travel on the lane L2, since a position at which the lane change to the lane L2 is to be performed passes through a point P6 ahead of the point P5 by a predetermined distance D3, the lane determination unit 142 generates a target trajectory K9 giving priority to the lane of the traveling route. The position at which the lane change to the lane L2 is to be performed is, for example, a point at which the lane based on the traveling route determined by the route determination unit 53 is different from the lane determined on the basis of the set vehicle speed SV.

Figure 9:
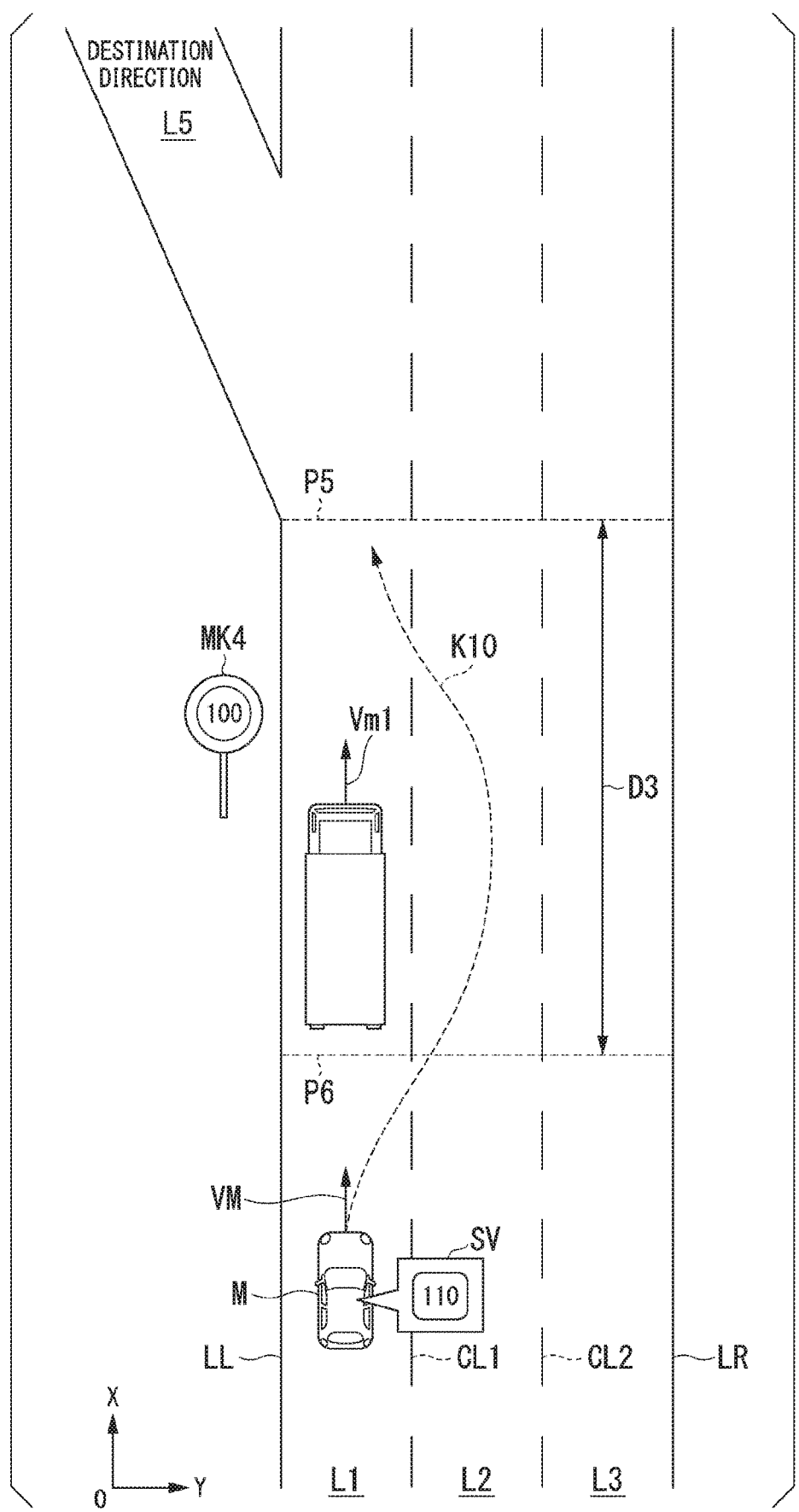
FIG. 9 is a diagram for explaining a process of an overtaking control unit in a case in which a position at which a lane on which a subject vehicle travels is different from a lane based on a traveling route is ahead of a point P6.

FIG. 9 is a diagram for explaining the process of the overtaking control unit 144 in a case in which the position at which the lane on which the subject vehicle M travels is different from the lane based on the traveling route is ahead of the point P6. As shown in FIG. 9, the subject vehicle M does not pass through the point P6 at a timing at which it is determined that the subject vehicle M travels on the lane L2. Therefore, the overtaking control unit 144 generates a target trajectory K10 for causing the subject vehicle M to overtake the other vehicle m1 traveling on the lane L1 by changing the lane to the lane L2 and then return to lane L1 before passing through the point P5.

Instead of the determination of the traveling lane based on whether or not passing through the predetermined distance D3, the overtaking control unit 144 may estimate a time until the subject vehicle M arrives at the point P5 on the basis of the position information and the vehicle speed VM of the subject vehicle M and change a content of the overtaking control on the basis of an estimation result. In this case, in a case in which the estimated time is less than the predetermined time, the overtaking control unit 144 generates the target trajectory K9, and in a case in which the estimated time is equal to or greater than the predetermined time, the overtaking control unit 144 generates the target trajectory K10.

In addition to the driving control at the time of branching shown in FIGS. 8 and 9, for example, the lane determination unit 142 and overtaking control unit 144 may perform similar control in a case in which lanes before the subject vehicle M turns to the right or left of the intersection point are the lanes L1 to L3.

Therefore, the lane determination unit 142 and the overtaking control unit 144 are able to suppress the subject vehicle M from deviating from the route toward the destination, and are able to cause the subject vehicle M to travel along a more appropriate traveling route based on the road environment.

[Process Flow]

Figure 10:
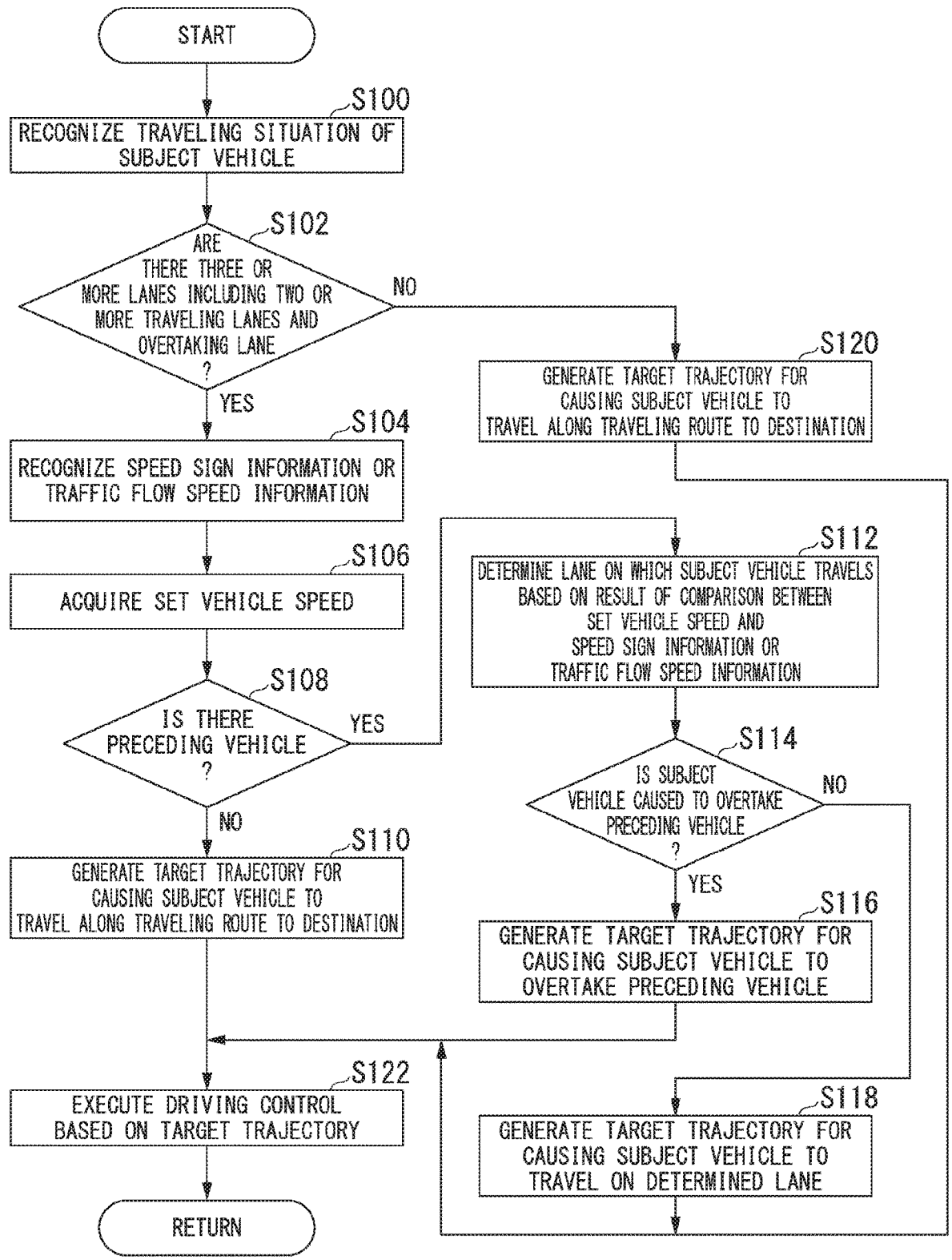
FIG. 10 is a flowchart showing a flow of a process executed by an automated driving control device according to an embodiment.

FIG. 10 is a flowchart showing a flow of a process executed by the automated driving control device 100 of the embodiment. The process of the present flowchart may be repeatedly performed, for example, at a predetermined cycle or at a predetermined timing. In the flowchart shown in FIG. 10, it is assumed that the route to the destination has already been determined by the route determination unit 53 of the navigation device 50. Although the flowchart shown in FIG. 10 shows an example in which the lane on which the subject vehicle M travels is determined in a case in which there are the three or more lanes including the two or more traveling lanes and the overtaking lane, as described above, in a case in which there are a plurality of traveling lanes, the following lane determination process may be performed.

First, the surrounding situation recognition unit 132 recognizes the traveling situation of the subject vehicle M (step S100). Next, the surrounding situation recognition unit 132 determines whether or not there are the three or more lanes including the two or more traveling lanes and the overtaking lane (step S102). In a case in which it is determined that there are the three or more lanes including the two or more traveling lanes and the overtaking lane, the speed recognition unit 134 recognizes the speed sign information or the traffic flow speed information (step S104).

Next, the lane determination unit 142 acquires the set vehicle speed (step S106), and determines whether or not there is the preceding vehicle of the subject vehicle M among the other vehicles recognized by the surrounding situation recognition unit 132 (step S108). In a case in which it is determined that there is no preceding vehicle, the lane determination unit 142 generates the target trajectory for causing the subject vehicle M to travel along the traveling route to the destination (step S110).

In the process of step S108, in a case in which it is determined that there is the preceding vehicle, the lane determination unit 142 determines the lane on which the subject vehicle M travels on the basis of the result of the comparison between the set vehicle speed and the speed sign information or the traffic flow speed information (step S112). Next, the overtaking control unit 144 determines whether or not to cause the subject vehicle M to overtake the preceding vehicle (step S114). In a case in which it is determined that the subject vehicle M is caused to overtake the preceding vehicle, the overtaking control unit 144 generates the target trajectory for causing the subject vehicle M to overtake the preceding vehicle (step S116). In a case in which it is determined that the subject vehicle M is caused not to overtake the preceding vehicle, the overtaking control unit 144 generates the target trajectory for causing the subject vehicle M to travel on the lane determined by the lane determination unit 142 (step S118).

In the process of step S102, in a case in which it is determined that there is no three or more lanes including two or more traveling lanes and an overtaking lane, the lane determination unit 142 generates the target trajectory for causing the subject vehicle M to travel along the traveling route to the destination (step S120). Next, after the process of step S110, S116, S118, or S120 ends, the driving control unit executes the driving control based on the target trajectory (step S122). Therefore, the process of the present flowchart is ended.

According to the embodiment described above, the automated driving control device 100 is able to execute the driving control adapted for the road environment. Specifically, according to the present embodiment, in a road with three lanes on one side, in which the traveling lane is two or more lanes, it is possible to change the lane on which the subject vehicle M travels on the basis of the set vehicle speed set by the occupant. For example, by changing the lane on which the subject vehicle M travels depending on a case in which the set vehicle speed is less than a legal speed of the lane or and a case in which the set vehicle speed is equal to or greater than the legal speed, it is possible to driving control adapted for the traffic flow or a road form, and it is possible to realize a behavior of the subject vehicle M close to a sense of traveling of the occupant. According to the present embodiment, it is possible to return to a more appropriate traveling lane on the basis of the surrounding situation after executing control for overtaking the preceding vehicle.

[Hardware Constitution]

Figure 11:
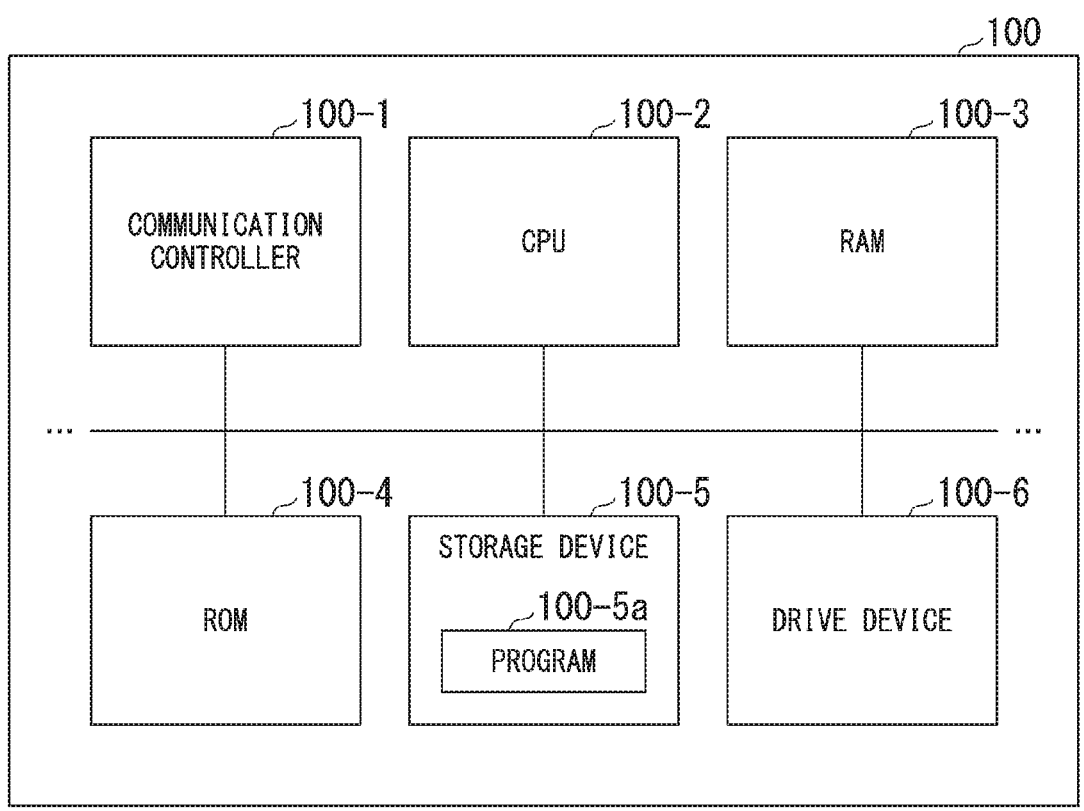
FIG. 11 is a diagram showing an example of a hardware constitution of the automated driving control device according to an embodiment.

FIG. 11 is a diagram showing an example of a hardware constitution of the automated driving control device 100 according to an embodiment. As shown in the figure, the automated driving control device 100 includes a constitution in which a communication controller 100-1, a CPU 100-2, a RAM 100-3 used as a working memory, a ROM 100-4 storing a boot program and the like, a storage device 100-5 such as a flash memory or an HDD, a drive device 100-6 and the like are mutually connected by an internal bus or a dedicated communication line. The communication controller 100-1 communicates with components other than the automated driving control device 100. A portable storage medium (for example, a computer readable non-transitory storage medium) such as an optical disk is attached to the drive device 100-6. A program 100-5a executed by the CPU 100-2 is stored in the storage device 100-5. This program is developed in the RAM 100-3 by a direct memory access (DMA) controller (not shown) or the like and executed by the CPU 100-2. The program 100-5a referred to by the CPU 100-2 may be stored in the portable storage medium attached to the drive device 100-6 or may be downloaded from another device through the network. Therefore, a part or all of the first control unit 120, the second control unit 160, the HMI control unit 180, and the storage unit 190 of the automated driving control device 100 are realized.

The above-described embodiment is able to be expressed as follows.

A vehicle control device including:
a storage device configured to store a program; and
a hardware processor,
wherein the hardware processor executes the program stored in the storage device to:
recognize a surrounding situation of a subject vehicle;
receive, by a reception unit, an input of a set vehicle speed set by an occupant of the subject vehicle; and
execute driving control for controlling one or both of steering and acceleration or deceleration of the subject vehicle on the basis of the recognized surrounding situation and the set vehicle speed received by the reception unit,
wherein, in a case in which a plurality of traveling lanes on which the subject vehicle is able to travel in a progress direction of the subject vehicle are recognized by the surrounding situation, a lane on which the subject vehicle travels is determined among the plurality of traveling lanes on the basis of the set vehicle speed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a recognition unit configured to recognize a surrounding situation of a subject vehicle;
a reception unit configured to receive an input of a set vehicle speed set by an occupant of the subject vehicle; and
a driving control unit configured to control one or both of steering and acceleration or deceleration of the subject vehicle on the basis of the surrounding situation recognized by the recognition unit and the set vehicle speed received by the reception unit,
wherein, in a case in which a plurality of traveling lanes on which the subject vehicle is able to travel in a progress direction of the subject vehicle are recognized by the recognition unit, the driving control unit determines a lane on which the subject vehicle travels among the plurality of traveling lanes on the basis of the set vehicle speed,
wherein, in a case in which a traveling time or a traveling distance of the lane on which the subject vehicle travels is equal to or less than a predetermined value, the driving control unit suppresses execution of a lane change.

2. The vehicle control device of claim 1,
wherein, in a case in which it is recognized by the recognition unit that there are three or more lanes including two or more traveling lanes on which the subject vehicle is able to travel in the progress direction of the subject vehicle and overtaking lanes, the driving control unit determines the lane on which the subject vehicle travels among the three or more lanes on the basis of the set vehicle speed.

3. The vehicle control device of claim 1,
wherein the recognition unit recognizes speed sign information or traffic flow speed information of the lane on which the vehicle travels on the basis of the surrounding situation, and
the driving control unit determines the lane on which the subject vehicle travels among the plurality of traveling lanes on the basis of a result of a comparison between the set vehicle speed and the speed sign information or the traffic flow speed information recognized by the recognition unit.

4. The vehicle control device of claim 1,
wherein, in a case in which a preceding vehicle traveling in front on a traveling lane on which the subject vehicle travels is recognized by the recognition unit, the driving control unit determines the lane on which the subject vehicle travels among the plurality of lanes.

5. The vehicle control device of claim 2,
wherein, in a case in which a vehicle speed of a preceding vehicle traveling in front of a traveling lane on which the subject vehicle recognized by the recognition unit travels is less than a vehicle speed of the subject vehicle and a speed difference between a vehicle speed of the preceding vehicle and the vehicle speed or the set vehicle speed of the subject vehicle is equal to or greater than a threshold value, the driving control unit executes driving control for overtaking the preceding vehicle by a lane change from the traveling lane to an overtaking lane, determines whether or not to perform a lane change for returning the subject vehicle to the traveling lane from the overtaking lane after executing the driving control, and determines the lane on which the subject vehicle travels on the basis of a determined result.

6. The vehicle control device of claim 5,
wherein, among other vehicles recognized by the recognition unit, in a case in which the vehicle speed of the preceding vehicle traveling on the overtaking lane is equal to or less than a speed of speed sign information of the lane on which the subject vehicle travels or the vehicle speed of the subject vehicle, the driving control unit suppresses the lane change of the subject vehicle.

7. The vehicle control device of claim 5,
wherein, among a plurality of other vehicles recognized by the recognition unit, the driving control unit compares the vehicle speed of the preceding vehicle traveling on the traveling lane with the vehicle speed of the preceding vehicle traveling on the overtaking lane, and in a case in which the vehicle speed of the preceding vehicle traveling on the overtaking lane is faster than the vehicle speed of the preceding vehicle traveling on the traveling lane, the driving control unit executes the lane change from the traveling lane to the overtaking lane.

8. The vehicle control device of claim 1,
wherein, in a case in which the number of lanes of the traveling lane recognized by the recognition unit increases, the driving control unit suppress a lane change of the subject vehicle until the subject vehicle travels a predetermined distance from a point where the number of lanes increases or until a predetermined time has elapsed after passing through the point where the number of lanes increases.

9. The vehicle control device of claim 1, further comprising:
a route determination unit configured to determine a traveling route to a destination of the subject vehicle,
wherein, in a case in which a lane based on the traveling route determined by the route determination unit is different from a lane determined on the basis of the set vehicle speed, the driving control unit prioritizes the lane based on the traveling route.

10. The vehicle control device of claim 9,
wherein, in a case in which a distance to a point where the lane based on the traveling route determined by the route determination unit is different from the lane determined on the basis of the set vehicle speed is equal to or greater than a predetermined distance, or a time for which the subject vehicle arrives at the point where the lane based on the traveling route determined by the route determination unit is different from the lane determined on the basis of the set vehicle speed is equal to or greater than a predetermined time, the driving control unit prioritizes the lane determined on the basis of the set vehicle speed.

11. A vehicle control method of causing a vehicle control device to:
recognize a surrounding situation of a subject vehicle;
receive, by a reception unit, an input of a set vehicle speed set by an occupant of the subject vehicle; and
execute driving control for controlling one or both of steering and acceleration or deceleration of the subject vehicle on the basis of the recognized surrounding situation and the set vehicle speed received by the reception unit,
wherein, in a case in which a plurality of traveling lanes on which the subject vehicle is able to travel in a progress direction of the subject vehicle are recognized by the surrounding situation, a lane on which the subject vehicle travels is determined among the plurality of traveling lanes on the basis of the set vehicle speed,
wherein, in a case in which a traveling time or a traveling distance of the lane on which the subject vehicle travels is equal to or less than a predetermined value, suppress execution of a lane change.

12. A computer-readable non-transitory storage medium storing a program that causes a vehicle control device to:
recognize a surrounding situation of a subject vehicle;
receive, by a reception unit, an input of a set vehicle speed set by an occupant of the subject vehicle; and
execute driving control for controlling one or both of steering and acceleration or deceleration of the subject vehicle on the basis of the recognized surrounding situation and the set vehicle speed received by the reception unit,
wherein, in a case in which a plurality of traveling lanes on which the subject vehicle is able to travel in a progress direction of the subject vehicle are recognized by the surrounding situation, a lane on which the subject vehicle travels is determined among the plurality of traveling lanes on the basis of the set vehicle speed,
wherein, in a case in which a traveling time or a traveling distance of the lane on which the subject vehicle travels is equal to or less than a predetermined value, suppress execution of a lane change.

* * * * *